(12) United States Patent
Casarez et al.

(10) Patent No.: US 10,228,609 B2
(45) Date of Patent: *Mar. 12, 2019

(54) CAMERA GIMBAL MOUNT SYSTEM

(71) Applicant: GoPro, Inc., San Mateo, CA (US)

(72) Inventors: Theresa Loney Casarez, San Carlos, CA (US); John George Muhlenkamp, IV, Brisbane, CA (US); Stephen Yui, Oakland, CA (US); Ryan Harrison, Walpole, NH (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,741

(22) Filed: Nov. 21, 2017

(65) Prior Publication Data
US 2018/0095346 A1 Apr. 5, 2018

Related U.S. Application Data

(63) Continuation of application No. 15/385,279, filed on Dec. 20, 2016, now Pat. No. 9,904,149.
(Continued)

(51) Int. Cl.
*G03B 17/56* (2006.01)
*F16M 11/12* (2006.01)
(Continued)

(52) U.S. Cl.
CPC .............. *G03B 17/561* (2013.01); *A45F 5/10* (2013.01); *F16M 11/123* (2013.01);
(Continued)

(58) Field of Classification Search
None
See application file for complete search history.

(56) References Cited

U.S. PATENT DOCUMENTS

| | | |
|---|---|---|
| 4,158,490 A | 6/1979 | Gottschalk |
| 4,158,498 A | 6/1979 | Gottschalk |

(Continued)

OTHER PUBLICATIONS

PCT International Search Report and Written Opinion for PCT/US2016/868155, dated Mar. 23, 2017, 12 Pages.

*Primary Examiner* — William B Perkey
(74) *Attorney, Agent, or Firm* — Young Basile Hanlon & MacFarlane, P.C.

(57) ABSTRACT

A gimbal mount system is configured to a couple to a gimbal coupled to and securing a camera. The gimbal mount system includes a handle, a power source, a user interface, a mounting interface, a communication interface, and a communication bus. The mounting interface is located within an end of the gimbal mount system and includes an opening configured to receive a reciprocal mounting protrusion of the gimbal. A locking mechanism removably couples the gimbal to the gimbal mount system. The communication interface is located within the mounting interface and is configured to couple to a reciprocal communication interface of the gimbal. The communication bus is coupled to the power source, user interface, and communication interface and is configured to provide power from the power source to the gimbal. The communication bus may provide instructions to the gimbal based on user input received via the user interface.

18 Claims, 12 Drawing Sheets

Related U.S. Application Data

(60) Provisional application No. 62/274,077, filed on Dec. 31, 2015.

(51) Int. Cl.
*F16M 11/18* (2006.01)
*F16M 13/04* (2006.01)
*F16M 11/16* (2006.01)
*A45F 5/10* (2006.01)
*G03B 17/38* (2006.01)

(52) U.S. Cl.
CPC ............ *F16M 11/16* (2013.01); *F16M 11/18* (2013.01); *G03B 17/38* (2013.01); *G03B 17/563* (2013.01); *G03B 17/566* (2013.01)

(56) References Cited

U.S. PATENT DOCUMENTS

| | | | | |
|---|---|---|---|---|
| 9,904,149 | B2* | 2/2018 | Casarez | G03B 17/561 |
| 2008/0210025 | A1* | 9/2008 | Goossen | F16M 11/041 74/5.34 |
| 2009/0003822 | A1 | 1/2009 | Tyner | |
| 2009/0257741 | A1* | 10/2009 | Greb | F16M 13/04 396/55 |
| 2010/0079101 | A1* | 4/2010 | Sidman | F16M 11/041 318/649 |
| 2013/0343743 | A1* | 12/2013 | Yen | F16M 11/10 396/428 |
| 2014/0191094 | A1 | 7/2014 | Esarey | |
| 2014/0211975 | A1 | 7/2014 | Roberts | |
| 2015/0071627 | A1* | 3/2015 | Hoang | F16M 13/00 396/421 |
| 2015/0261070 | A1* | 9/2015 | Feng | G03B 17/561 396/421 |
| 2016/0048070 | A1* | 2/2016 | Overall | G03B 17/561 396/421 |
| 2016/0201847 | A1* | 7/2016 | Firchau | F16M 11/041 224/567 |
| 2016/0246162 | A1 | 8/2016 | Niemeyer | |
| 2016/0381271 | A1* | 12/2016 | Cheng | F16M 11/041 348/208.2 |
| 2017/0064176 | A1 | 3/2017 | Kim | |
| 2017/0089513 | A1 | 3/2017 | Pan | |
| 2017/0146892 | A1* | 5/2017 | Wei | F16M 11/045 |
| 2017/0153532 | A1* | 6/2017 | Le | G03B 17/561 |
| 2017/0159875 | A1* | 6/2017 | Wagner | F16M 13/04 |
| 2017/0192341 | A1* | 7/2017 | Casarez | G03B 17/561 |
| 2017/0301230 | A1* | 10/2017 | Liu | G08C 17/02 |
| 2018/0095346 | A1* | 4/2018 | Casarez | G03B 17/566 |

\* cited by examiner

100

300

CAMERA GIMBAL MOUNT SYSTEM

CROSS REFERENCE TO RELATED APPLICATIONS

This application is a continuation of U.S. application Ser. No. 15/385,279, filed Dec. 20, 2016, which claims the benefit of U.S. Provisional Application No. 62/274,077, filed Dec. 31, 2015, which is incorporated by reference in its entirety.

BACKGROUND

Technical Field

This disclosure relates to camera gimbals, and in particular, to gimbal mount systems configured to power and control cameras and gimbals coupled to the gimbal mount system.

Description of the Related Art

Digital cameras are increasingly used in outdoors and sports environments. In these environments, digital cameras may be held by a user performing an activity or may be mounted to an object in motion. As a result, the motion may affect the quality of the media captured by the digital camera, causing blurry pictures, shaky footage, or other low-quality media. To ensure that high quality media is captured, a user may secure a digital camera to a gimbal, a mechanical device that includes inertial measurement units and motors and can sense and manipulate the orientation of the digital camera to correct for movement. However, existing gimbals may not be configured to be handheld by a user or may not be user-friendly. As such, a gimbal mount system that secures a gimbal and enables a user to easily hold and control the functions of the gimbal and/or camera is desired.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates a gimbal mount system and a gimbal, according to one example embodiment.

DETAILED DESCRIPTION

Figure 1:
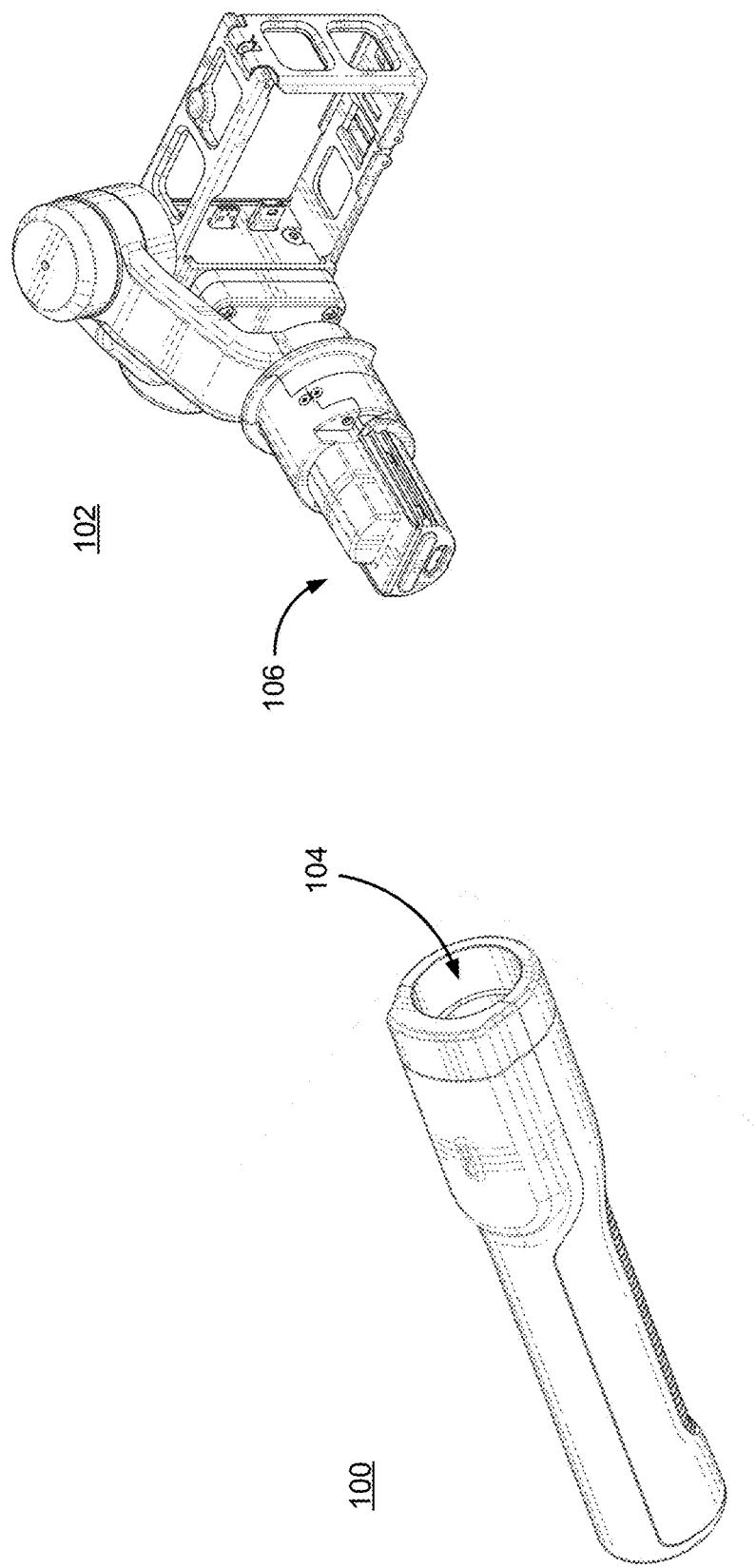

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein, "gimbal" refers to a mechanical device for use with and coupling to a camera and mounting configurations. The gimbal includes an inertial measurement unit that can sense the orientation of the camera and a predetermined number of electronic motors (e.g., three motors) which can manipulate the orientation of the camera. This orientation corresponds to the pitch, roll, and yaw of the camera. The gimbal can be removably coupled to a variety of mount platforms, such as an aerial vehicle, a handheld grip (a "gimbal mount system" hereinafter), or a rotating mount. Moreover, the camera can be removably coupled to the gimbal and can be held in a removable camera frame.

The gimbal can also provide a communicative interface between the camera and a gimbal mount system, such that the gimbal mount system receives images and video content from the camera, and such that the camera receives power and configuration/operating instructions from the gimbal mount system. As described below, the gimbal mount system enables for the control of the movement of the gimbal based on, for instance, user instructions or interactions. Such configurations beneficially enable the camera mounted to the gimbal to capture images and video in a way best suited to a media capture environment, the wishes of a user, and the like.

Configuration Overview

In one embodiment, a gimbal mount system is configured to couple to a gimbal configured to in turn secure a camera. The body of the gimbal mount system includes a handle, a power source, a user interface, a mounting interface, a communication interface, and a communication bus. The mounting interface is located within an end of the body of the gimbal mount system and comprises an opening configured to receive a reciprocal mounting protrusion of the gimbal. A locking mechanism removably couples the gimbal to the gimbal mount system. The communication interface is located within the mounting interface and is configured to couple to a reciprocal communication interface of the gimbal. The communication bus is coupled to the power source, user interface, and communication interface and is configured to provide power from the power source to the gimbal. The communication bus may provide one or more instructions to the gimbal based on user input received via the user interface.

Example Camera System and Camera Controller Configuration

FIG. 1 illustrates a gimbal mount system 100 and a gimbal 102, according to one example embodiment. As noted above, a gimbal, such as gimbal 102, is a mechanical device that is configured to secure a camera and manipulate the orientation of the camera along one or more axes. In the embodiment of FIG. 1, the gimbal mount system 100 is configured to couple to the gimbal 102 and serve as a gimbal mount that can be handheld by a user. In some embodiments, the gimbal mount system 100 may also be configured to provide power and control instructions to the gimbal 102 and/or to the camera secured by the gimbal. In the embodiment of FIG. 1, the gimbal mount system 100 may include a power source, e.g., a battery. The gimbal mount system 100 may provide power from the power source to the gimbal 102 and/or the camera via a communicative interface between the gimbal mount system and the gimbal. The gimbal mount system 100 may also include a controller configured to provide instructions to the gimbal 102 and/or the camera, as described below in greater detail. In order to enable a user to provide instructions to the gimbal 102 and/or the camera via the controller, the gimbal mount system 100 may include a user interface. The user interface can include buttons, displays, switches, or any other suitable interaction means.

To couple the gimbal 102 to the gimbal mount system 100, the gimbal mount system may include a mounting interface 104 configured to receive and secure a mounting protrusion 106 of the gimbal. The mounting protrusion 106 may include structural features that allow the gimbal 102 to reciprocally mate with the mounting interface 104, which will be described in further detail with regards to FIGS. 6-7. The gimbal mount system 100 may further include a securing mechanism for removably coupling the gimbal 102 to the gimbal mount system. In some embodiments, the communicative interface between the gimbal mount system 100 and the gimbal 102 may be located within the mounting interface 104 of the gimbal mount system.

Figure 2A:
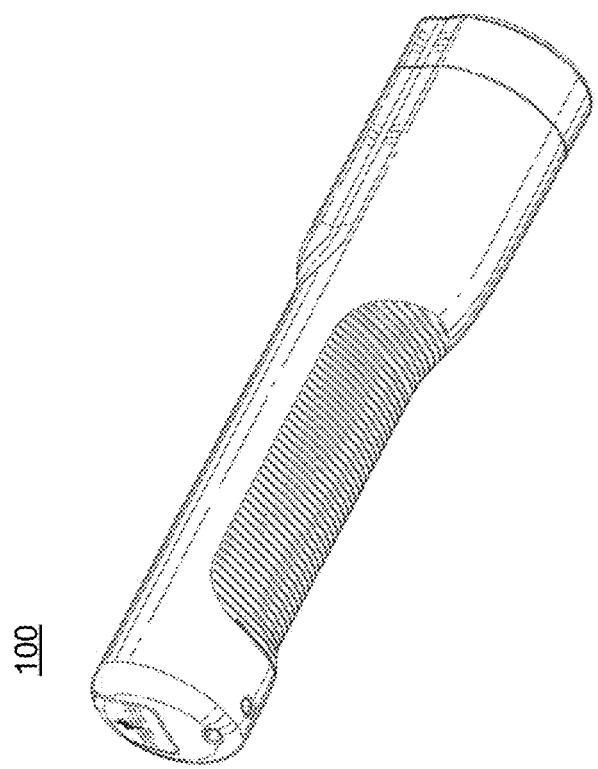
FIGS. 2A and 2B illustrate perspective views of the gimbal mount system, according to one example embodiment.
Figure 2B:
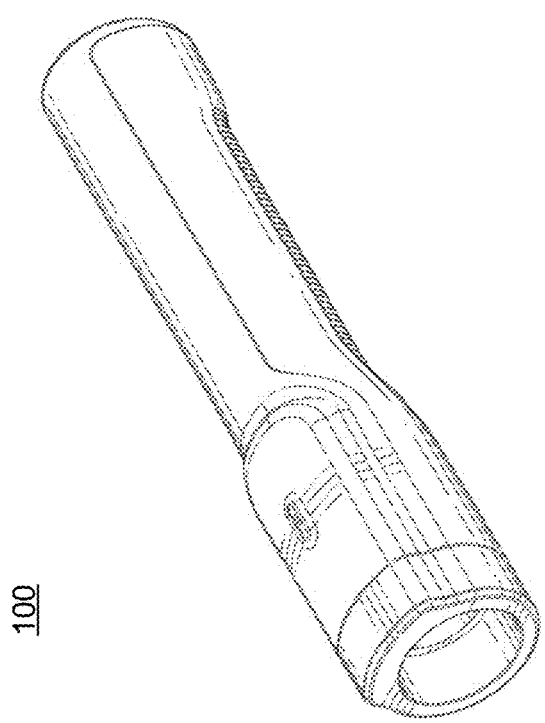

FIGS. 2A and 2B illustrate perspective views of the gimbal mount system 100, according to one example embodiment. The gimbal mount system 100 may serve as a handheld gimbal mount for a user, allowing the user to easily hold the gimbal while capturing images or video with the camera. As such, the gimbal mount system 100 may have an ergonomic shape such as the substantially cylindrical body illustrated in FIGS. 2A and 2B. However, the shape may vary in other embodiments such that it provides an ergonomic grip for the user. The gimbal mount system 100 may be composed of rigid materials, e.g., metal or hard plastics, that may be lightweight, waterproof, and durable.

Figure 3:
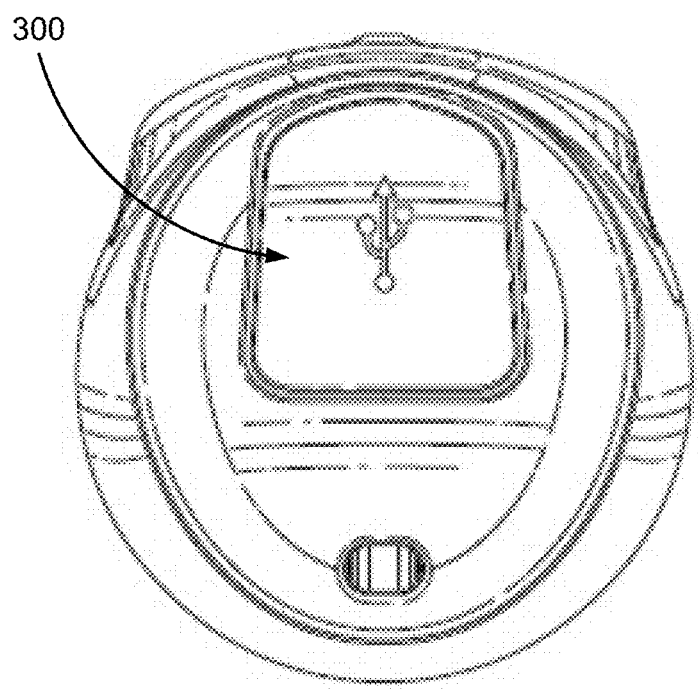
FIG. 3 illustrates a bottom view of the gimbal mount system, according to one example embodiment.

FIG. 3 illustrates a bottom view of the gimbal mount system 100, according to one example embodiment. In the embodiment of FIG. 3, the gimbal mount system 100 includes a communication I/O port 300 located at the base of the gimbal mount system (under a protective and removable door). In other embodiments, the I/O port 300 may be located on a side of the gimbal mount system 100. The communication I/O port 300 may enable a user to couple the gimbal mount system 100 to an external power source, enabling the user to charge the power source of the gimbal mount system. The communication I/O port 300 may also be configured for data transmission and may enable a user to couple the gimbal mount system 100 to a computing system. In this configuration, a camera or a gimbal 102 communicatively coupled to the gimbal mount system 100 through the mounting interface 104 may in turn be communicatively coupled to the computing system via the communication I/O port 300. For instance, this configuration may enable a user to transfer media files from the camera to the computing system via the communication I/O port 300 when the camera is coupled to the gimbal, which in turn is coupled to the gimbal mount system. In some embodiments, the communication I/O port 300 may include a protective cover (as illustrated in FIG. 3) that may create a waterproof or water-resistant seal or may protect the communication I/O port from external debris.

Figure 4:
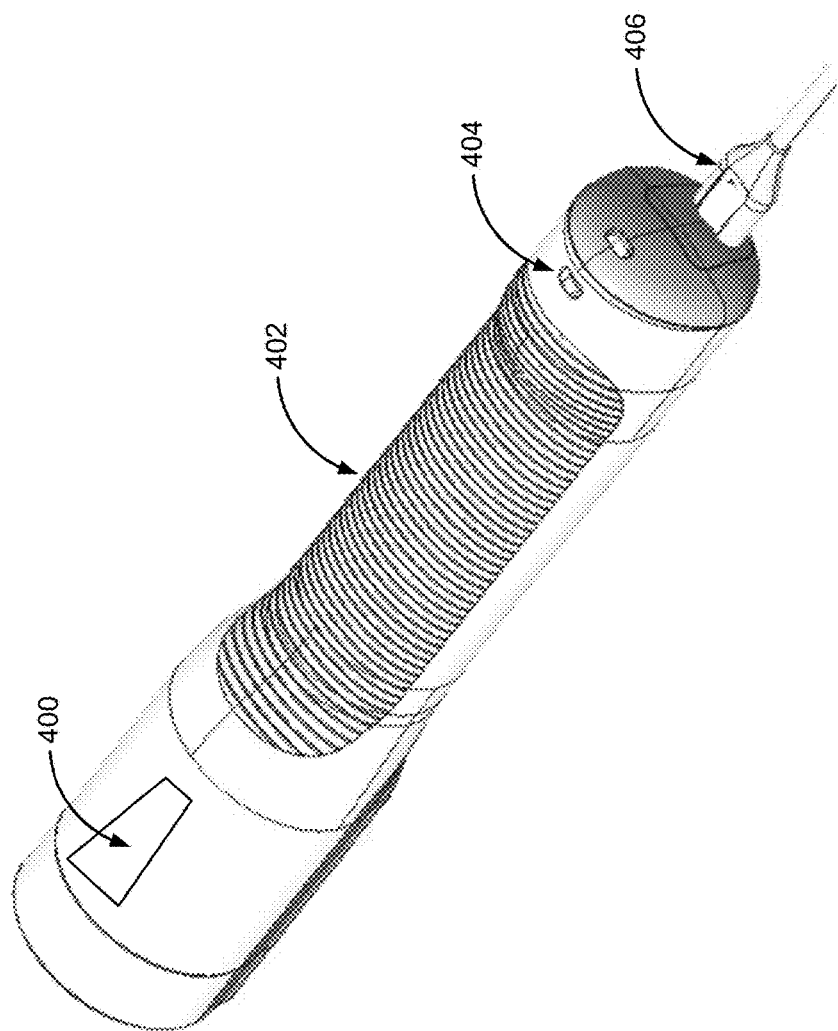
FIG. 4 illustrates a handle of the gimbal mount system, according to one example embodiment.

FIG. 4 illustrates a side view of the gimbal mount system 100, according to one example embodiment. In some embodiments, the gimbal mount system 100 includes a kickstand 400, a handle grip 402, and a lanyard hole 404. In the embodiment of FIG. 4, the kickstand 400 may be an integrated hinging surface that may or may not sit flush with an outer surface of the gimbal mount system 100 in a folded configuration. In an extended configuration, the kickstand 400 is flipped out and extends away from the surface of the gimbal mount system 100. The extended configuration may allow a user to place the gimbal mount system 100 on a surface without laying it flat against the surface or to prop the gimbal mount system against a surface or object. This may permit the user to continue to use the gimbal hands-free without affecting the function of the gimbal. When the kickstand 400 is not in use, the user may return the kickstand to the folded configuration, such that the kickstand no longer extends away from the surface of the gimbal mount system 100.

The handle grip 402 may be a textured area on an outer surface of the gimbal mount system 100. The handle grip 402 may provide a comfortable, ergonomic grip for the user, allowing the user to easily hold the gimbal mount system 100. In some embodiments, the handle grip 402 may be composed of a pliable material, e.g., rubber, silicone, or any other suitable material. The lanyard hole 404 may be configured to attach a lanyard that may help secure the gimbal mount system 100 to the user while holding the gimbal mount system. The lanyard hole 404 may also be configured to attach to tethers, wristbands, or any other suitable strap. Also illustrated in FIG. 4 is a cord 406 plugged into the communication I/O port 300 at the base of the gimbal mount system 100. The cord 406 may charge or provide power to the gimbal mount system 100 or gimbal or may be transfer data from the gimbal mount system or gimbal to a computing system, as described with regards to FIG. 3.

Figure 5:
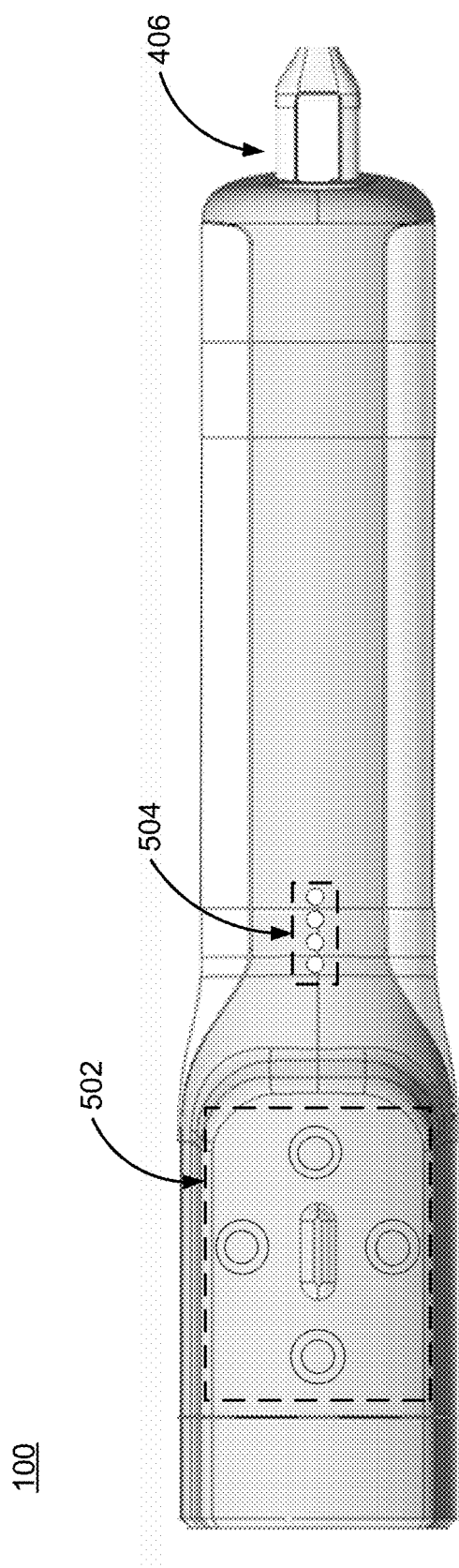
FIG. 5 illustrates a user interface of the gimbal mount system, according to one example embodiment.

FIG. 5 illustrates a user interface 500 of the gimbal mount system 100, according to one example embodiment. In the embodiment of FIG. 5, the user interface 500 includes a set of buttons 502 configured to perform a variety of functions. These functions may include but are not limited to: powering a gimbal or camera on and off, controlling a camera shutter, selecting one or more camera or gimbal modes, tagging highlights within media (including an indicator of a moment of interest within media metadata for simplified identification in post-processing), control/locking of gimbal pitch or yaw, powering a Wi-Fi function on and off, and any other operation of a camera or a gimbal. A user may press one or more of the buttons 502 to control a function. The buttons 502 may have various behaviors, such that a short press of a button controls a first function while a long press (press and hold) controls a second function. Each button can correspond to a different camera or gimbal function.

In the embodiment of FIG. 5, the user interface 500 also includes a set of LEDs 504. The set of LEDs 504 may be configured to indicate one or more of: an amount of battery power remaining within the gimbal mount system; a mode, status, or characteristic of the gimbal mount system, camera, or gimbal; or any other suitable property of the gimbal mount system, gimbal, and camera. The set of LEDs 504 may provide these indications by illuminating a specific pattern or a specific number of LEDs for a specific amount or frequency of time. For example, a number of illuminated LEDs may correspond to a percentage of the remaining battery life of the gimbal mount system 100. Similarly, a number of LEDs may flash while the gimbal mount system 100 is charging to indicate the progress of the battery charge. In addition to LEDs, the gimbal mount system can include other indicators or displays, such as LCDs, monitors, and the like.

Figure 6B:
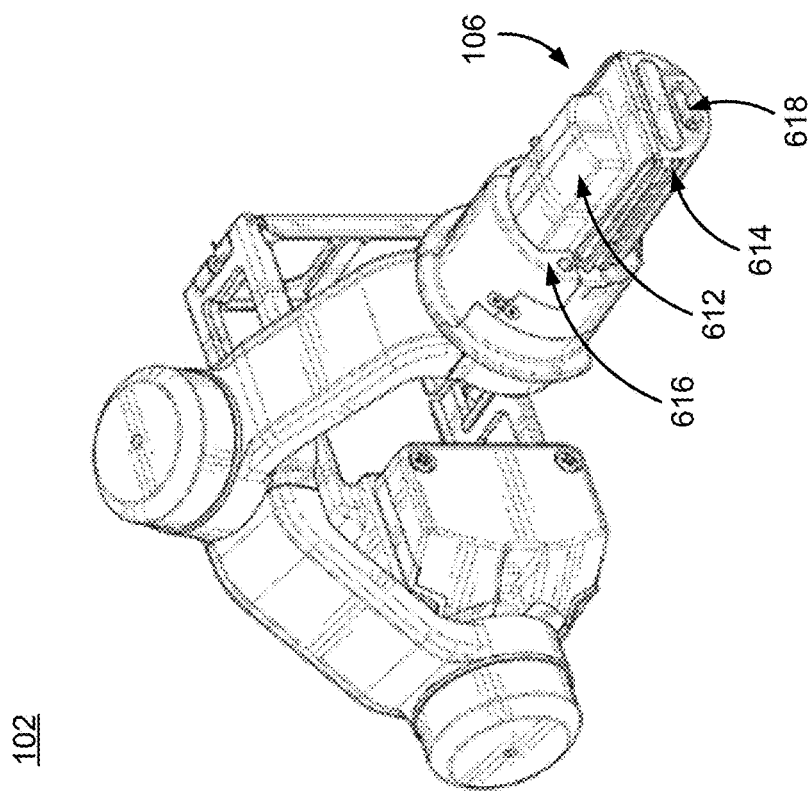
FIGS. 6A and 6B illustrate close-up perspective views of a mounting interface of the gimbal mount system, according to one example embodiment.
Figure 6A:
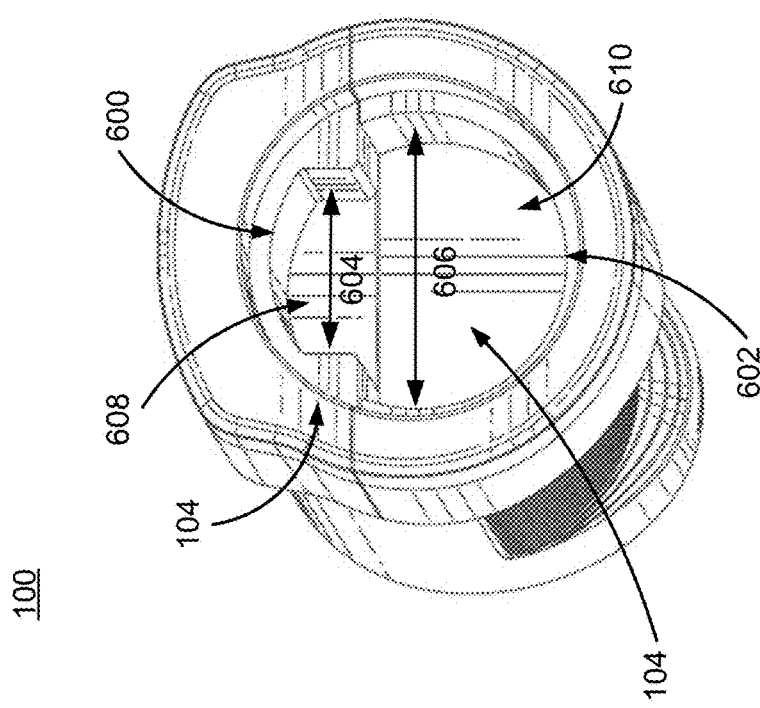

FIG. 6A illustrates a close-up perspective view of a mounting interface 104 of the gimbal mount system 100, according to one example embodiment. The mounting interface 104 includes recesses configured to receive the reciprocal mounting protrusion 106 of the gimbal 102. The configuration of the mounting interface 104 is such that it comprises two recesses 600, 602, wherein the recesses are each substantially C-shaped and are aligned along the respective flat planes of the C-shape. The first recess 600 has a smaller width (width 604 of FIG. 6A) relative to the second C-shaped recess 602 (width 606 of FIG. 6A). In addition, the first recess 600 extends a first depth into the gimbal mount system 100 (the depth between the front of the gimbal mount system and surface 608 of FIG. 6A), and the second recess 602 extends a second depth into the gimbal mount system 100 (the depth between the front of the gimbal mount system and surface 610 of FIG. 6A), greater than the first depth. Increased depths may provide greater stability and support of the gimbal 102 when secured to the gimbal mount system 100. In the embodiment of FIG. 6A, the second depth is greater than the first depth, but the depths may be equal or vice versa in other embodiments. In some embodiments, the recesses may vary in shape, given that they are structured to reciprocally mate with the mounting protrusion 106.

FIG. 6B illustrates a perspective view of the gimbal 102 described herein. The mounting protrusion 106 of the gimbal 102 is structured such that the geometry is complementary to the mounting interface 104 of the gimbal mount system 100. In the embodiment of FIG. 6B, the mounting protrusion 106 comprises two protrusions 612, 614 that are each substantially C-shaped and are mated along the respective flat planes. The protrusions 612, 614 extend outward from a surface 616 of the gimbal 102. In this configuration, the protrusions 612, 614 are configured to be inserted into the recesses 600, 602 to reciprocally mate the mounting interface 104 and the mounting protrusion 106. The first protrusion 612 extends less than the second protrusion 614, accounting for the reciprocal depths of the surfaces 608 and 610 within the mounting interface 104, respectively. Additionally, in some embodiments, the mounting protrusion 106 of the gimbal 102 can have features on the protrusions 612, 614, such as foam, rubber, any sort of padding material or additional padding structures, to ensure a secure fit between the reciprocal recesses 600, 602 and protrusions 106. In the embodiment of FIG. 6B, the gimbal 102 includes a communicative interface 618 configured to align with and communicatively couple to a communicative interface (not shown) of the gimbal mount system 100, discussed in further detail with regards to FIGS. 7A and 7B. The asymmetric configuration of the mounting interface 104 may ensure that the gimbal 102 is secured to the gimbal mount system 100 in a specific orientation, which may also ensure correctly alignment of the communicative interface between the gimbal mount system and the gimbal 102.

Figure 7B:
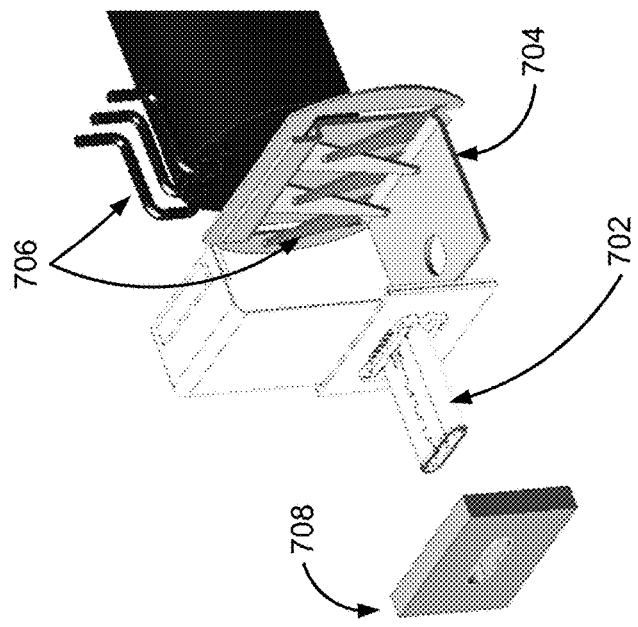
FIGS. 7A and 7B illustrate a communicative interface between the gimbal mount system and the gimbal, according to one example embodiment.
Figure 7A:
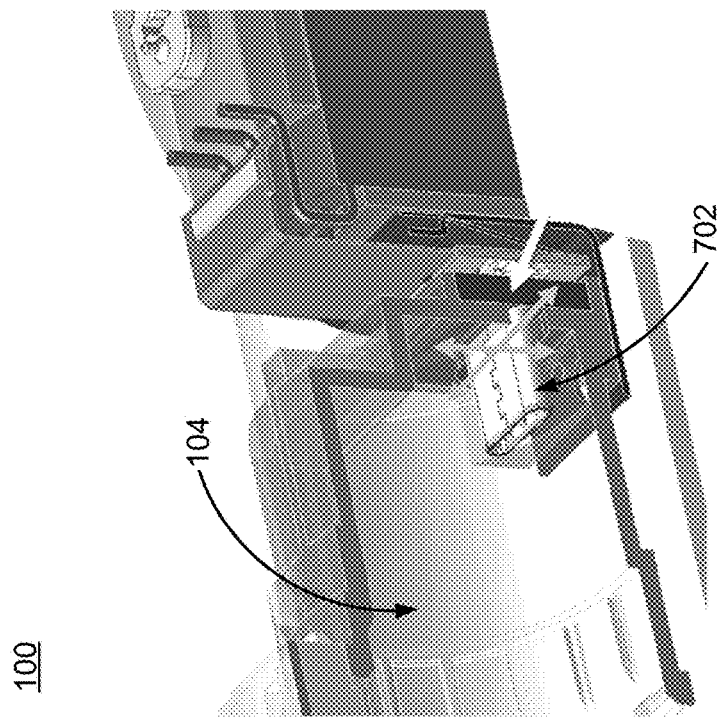

FIGS. 7A and 7B illustrate a communicative interface between the gimbal mount system 100 and the gimbal 102, according to one example embodiment. In the embodiments of FIGS. 7A and 7B, a communication I/O port 702 is positioned within the mounting interface 104 of the gimbal mount system 100 such that the communication I/O port is exposed within and protruding from an inside bottom surface of the mounting interface. The communication I/O port 702 may be coupled to a communication bus within the gimbal mount system 100. The communication bus may be coupled to the power source, the user interface, and the communicative interface of the gimbal mount system 100. The communication bus may provide one or more instructions to the gimbal 102 based on user input received via the user interface 502. The communication I/O port 702 may be positioned such that when a gimbal 102 is coupled to and secured to the gimbal mount system 100, the communication I/O port 702 may communicatively couple to a communication I/O port within the gimbal, such as communicative interface 618 of FIG. 6. As previously mentioned, the communication I/O port 300 of the gimbal mount system 100 may enable a user to couple the gimbal mount system to a computing system. Through the communicative interface between the gimbal mount system 100 and the gimbal 102, the gimbal and/or the camera may also be communicatively coupled to the computing system. For instance, the communicative interface may enable a user to transfer media files from the camera to the computing system. In addition, the communication bus of the gimbal mount system 100 may be electrically coupled to the power source of the gimbal 102 and may act as a power bus for the gimbal. In some embodiments, the gimbal mount system 100 may include a power source, such as a battery, and may provide power from the power source to the gimbal 102 and/or camera via a power bus between the power source and the gimbal. In some embodiments, the power bus is a communication bus with one or more power lines within the communication bus, for instance in embodiments where the communication bus is a USB Type-C bus.

It should be noted that in some embodiments, a camera coupled to a gimbal can identify moments of interest within captured media based on patterns of motion data measured during the capture of the media. As the gimbal is configured to counter such motion, the gimbal can further be configured to provide information across the communicative interface to the gimbal mount system 100 describing such motion to the camera and the gimbal mount system, beneficially enabling the camera (or a media processing system that receives captured media from the gimbal mount system and/or camera) to identify such moments of interest without the camera experiencing such motion itself.

In some embodiments, the gimbal mount system 100 may further include a suspension system for the communicative interface within the gimbal mount system. In the embodiments of FIGS. 7A and 7B, the suspension system is configured to enable the gimbal mount system 100 to flexibly couple to the gimbal 102 while maintaining a communicative interface between the gimbal mount system and the gimbal during movement or misalignment of the gimbal relative to the gimbal mount system. In the embodiments of FIGS. 7A and 7B, the suspension system may include a spring plate 704. The spring plate 704 may be inserted in front of, adjacent to, or behind the communication I/O port 702 protruding from the gimbal mount system 100. The spring plate 704 may include a plurality of protrusions 706 that are capable of suspending the communication I/O port 702 or the communication bus from a circuit or other electronic interface, or any other surfaces within the gimbal mount system 100. In the embodiments of FIGS. 7A and 7B, the plurality of protrusions 706 are capable of bending or flexing to account for tri-directional movement of the communicative interface between the gimbal 102 and the gimbal mount system 100, thereby beneficially isolating the communicative interface from vibrations or external forces. The plurality of protrusions 706 may also be capable of accommodating for alignment mismatch between the gimbal 102 and the gimbal mount system 100. Such a spring plate 704 beneficially enables the communicative interface to flex relative to the gimbal mount system 100 while maintaining the connection between the gimbal 102 and the gimbal mount system via the communicative interface. In addition, the communicative interface of the gimbal mount system 102 can be surrounded by a foam layer, such as foam layer 708. In some embodiments, the foam layer 708 may serve as a spacer between the communication I/O port 702 and the mounting interface 104, may help to absorb vibration or external forces, or may establish a waterproof or water-resistant seal between the communicative interface and the outside surface of the gimbal mount system. The foam layer 708 may be composed of any suitable compliant material.

Figure 8B:
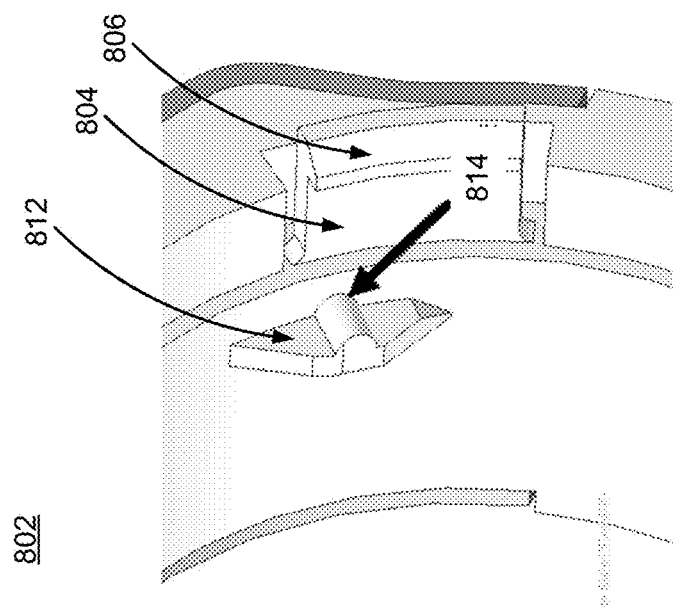
FIGS. 8A and 8B illustrate the features of a locking collar of the gimbal mount system, according to one example embodiment.
Figure 8A:
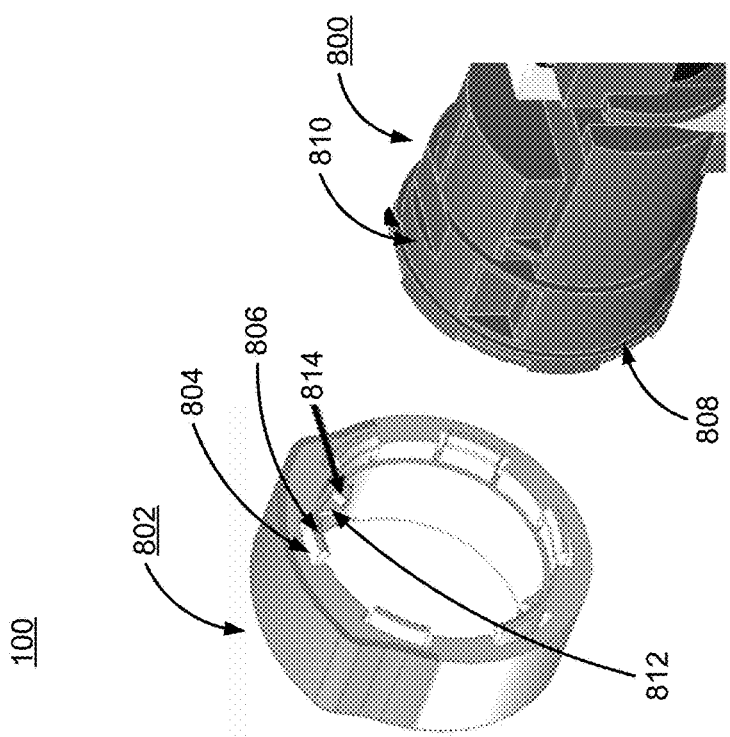

FIGS. 8A and 8B illustrate the features of a locking collar 802 of the gimbal mount system 100, according to one example embodiment. The gimbal mount system 100 comprises a chassis 800 and a locking collar 802 configured to couple to a distal end of the chassis. In the embodiments of FIGS. 8A and 8B, the locking collar 802 is a ring structured such that the inner diameter substantially sheaths the distal end of the chassis 800 when coupled. The mounting interface 104 begins at the distal end of the chassis 800 and extends into the body of the chassis, aligning with the inner diameter of the locking collar 802 when coupled to the chassis. Surrounding the ring is a plurality of protrusions 804 extending outwardly normal from a bottom surface of the locking collar 802. Each protrusion 804 comprises a wedge 806 structured such that a flat edge of the wedge mates with a reciprocal ridge 808 on the chassis 800. When the locking collar 802 is coupled to the chassis 800, each of the plurality of wedges 806 is secured underneath the ridge 808, preventing the locking collar 802 from being removed from the chassis. The chassis 800 further comprises a protruding surface 810 around the outer circumference of the chassis, which allows the locking collar 802 to abut and rotate around the protruding surface while secured. This configuration allows the locking collar 802 to rotate from a locked configuration to an unlocked configuration, and vice versa. In the embodiments of FIGS. 8A and 8B, the angle of rotation is 45 degrees, but it may vary in other embodiments, e.g., between 10-180 degrees. In the embodiment of FIGS. 8A and 8B, the locking collar 802 further comprises a plurality of ribs 812 located along the circumference of the inner ring. Each rib 812 includes a rounded detent feature 814 that is configured to mate with a reciprocal dimple on a gimbal.

Figure 9B:
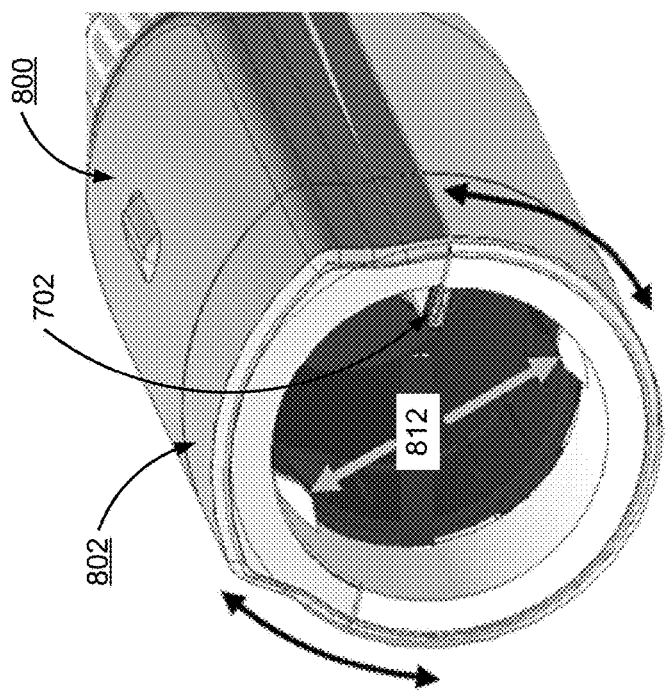
FIGS. 9A and 9B illustrate a locking mechanism for securing the gimbal to the gimbal mount system, according to one example embodiment.
Figure 9A:
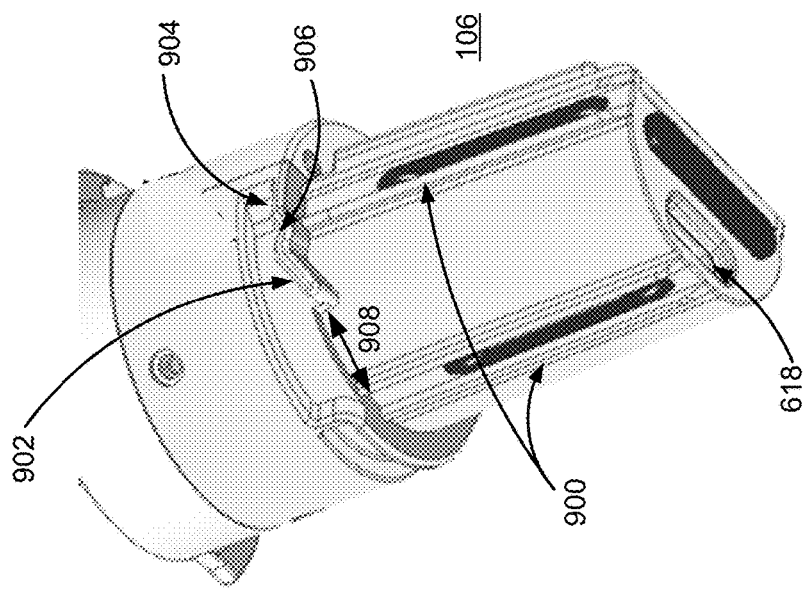

FIGS. 9A and 9B illustrate a locking mechanism for securing the gimbal 102 to the gimbal mount system 100, according to one example embodiment. In the embodiment of FIG. 9A, the mounting protrusion 106 of the gimbal 102 comprises a plurality of alignment features 900 and a plurality of detented ramps 902. The alignment features 900 may be configured to serve as guides as the mounting protrusion 106 is inserted into the mounting interface 104 of the gimbal mount system 100. In some embodiments, the alignment features 900 may include padding material or padding structures to ensure a secure fit between the mounting protrusion 106 and the mounting interface 104. Each detented ramp 902 is structured such that the ramp ramps up to a plateau 906 that comprises a dimple 908 within in the plateau. At a lower portion of each detented ramp 902 is an opening 908 that is configured to align with the ribs 812 of the locking collar 802 when the mounting protrusion 106 has been inserted into the mounting interface 106. In this position, the gimbal 102 and the gimbal mount system 100 are in the unlocked configuration, wherein the mounting protrusion 106 is reciprocally mating with the mounting interface 106, but the gimbal is not secured to the gimbal mount system.

To secure the gimbal 102 to the gimbal mount system 100, a user rotates the locking collar 802 by 45 degrees from the unlocked configuration to the locked configuration. As noted above, the degree of rotation may vary in other embodiments. As the locking collar 802 is rotated, the plurality of ribs 812 slide up respective detented ramps 902 until each rib 812 (and specifically, the rounded detent feature 814 of each rib) mates with a respective dimple 906 such that the rounded detent feature is inserted into and abuts a surface of the reciprocal dimple. To uncouple the gimbal 102 from the gimbal mount system 100, the locking collar 802 is rotated in the opposite direction, the plurality of rounded detented features 814 are displaced from the respective dimples 906, and the locking collar transitions to the unlocked configuration, allowing the gimbal to be removed from the gimbal mount system. This configuration of the locking mechanism allows a user to quickly secure the gimbal 102 to the gimbal mount system 100 without the use of a tool set.

Figure 10A:
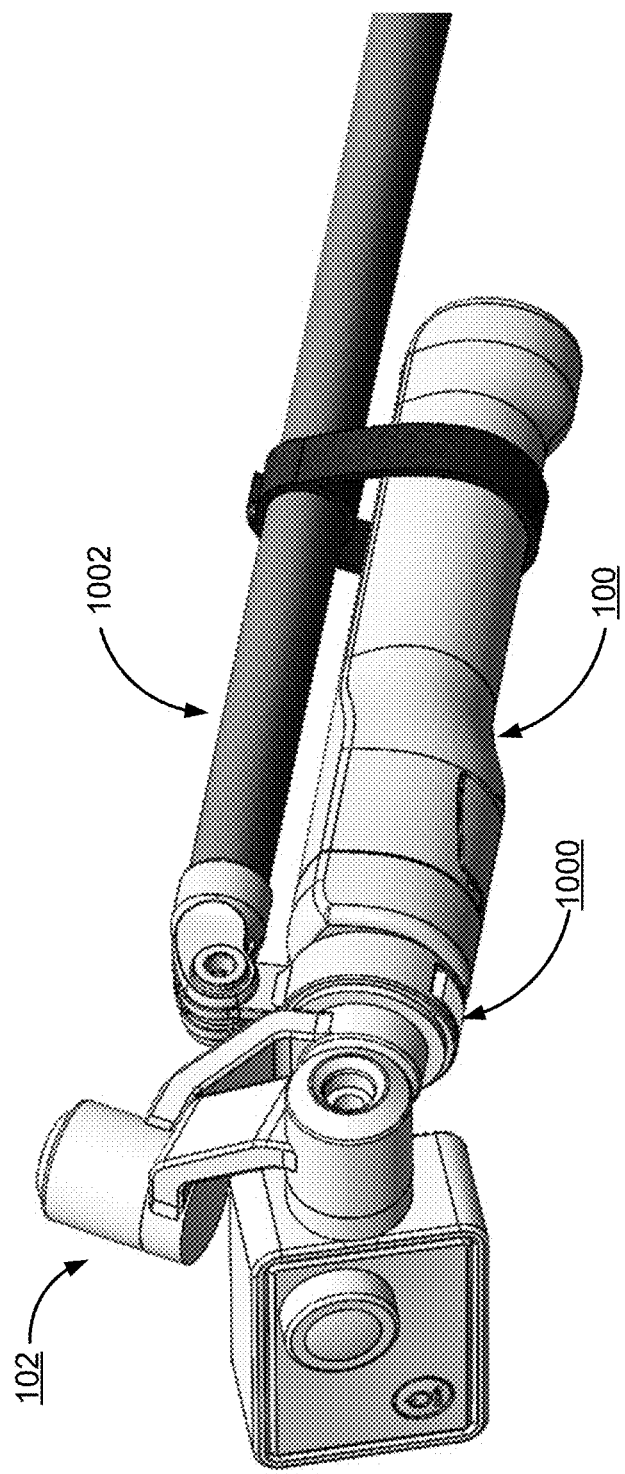
FIGS. 10A and 10B illustrate an adapter for coupling the gimbal mount system to various mount components within a camera mount ecosystem, according to one example embodiment.
Figure 10B:
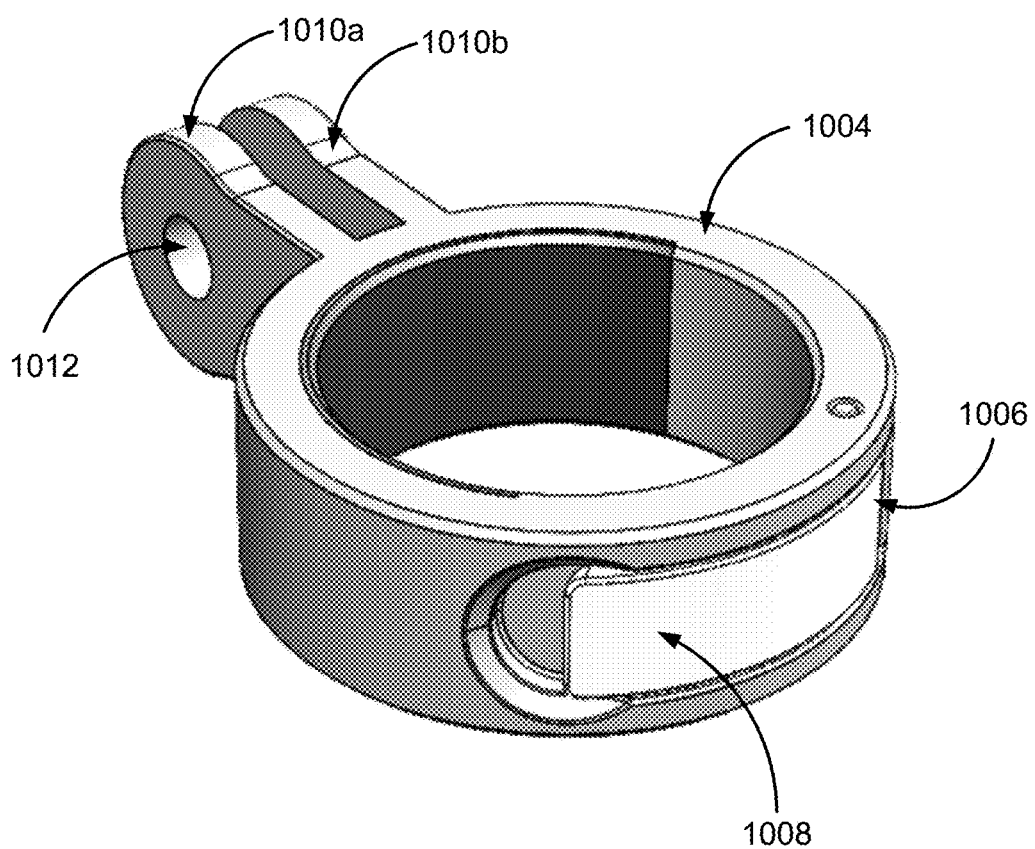

FIGS. 10A and 10B illustrate an adapter 1000 for coupling the gimbal mount system 100 to various mount components within a camera mount ecosystem, according to one example embodiment. As illustrated in FIG. 10A, the gimbal 102 and the gimbal mount system 100 have been mounted to an extension arm 1002 via the adapter 1000. In the embodiments of FIGS. 10A and 10B, the adapter 1000 includes a shaft collar 1004 that is substantially ring-shaped and is configured to securely enclose a structure of the gimbal 102. The adapter 1000 includes an integrated hinge 1006 and lever 1008. When the lever 1008 is in an unlocked position, a user can slide the adapter 1000 onto a shaft of a gimbal 102. Once the adapter 1000 has been positioned on the shaft of the gimbal 102, the user rotates the lever 1008 to the locked position, causing the shaft collar 1004 to exert compressive forces onto the shaft of the gimbal and securing the adapter to the gimbal. In some embodiments, the adapter 1000 has a plurality of protrusions 1010 protruding outward from an exterior surface of the ring that are configured to couple to a reciprocal mount component. In the embodiment of FIG. 10B, each protrusion 1010 comprises a hole 1012 at the distal end of the protrusion. The protrusions 1010 on the adapter 1000 can interlock with a plurality of protrusions of a reciprocal mount such that the holes of each set of protrusions are aligned along an axis and such that a screw or pin can be inserted into the aligned holes, rotatably securing the adapter to the reciprocal mount component. The adapter beneficially enables the gimbal mount system to couple to existing camera mounts, such as pole mounts, head/chest/wrist mounts, bike/surfboard/car tripods, rotating tables, or any other suitable mount. It should be noted that although the adapter 1000 of FIGS. 10A and 10B is configured to couple to the gimbal 102 itself, in other embodiments, the adapter can be configured to securely enclose a portion of the gimbal mount system 100, which in turn is configured to couple to the gimbal. The configuration of adapter 1000 is designed to be easy-to-use and easy-to-remove and does not require the use of a tool set.

Figure 11:
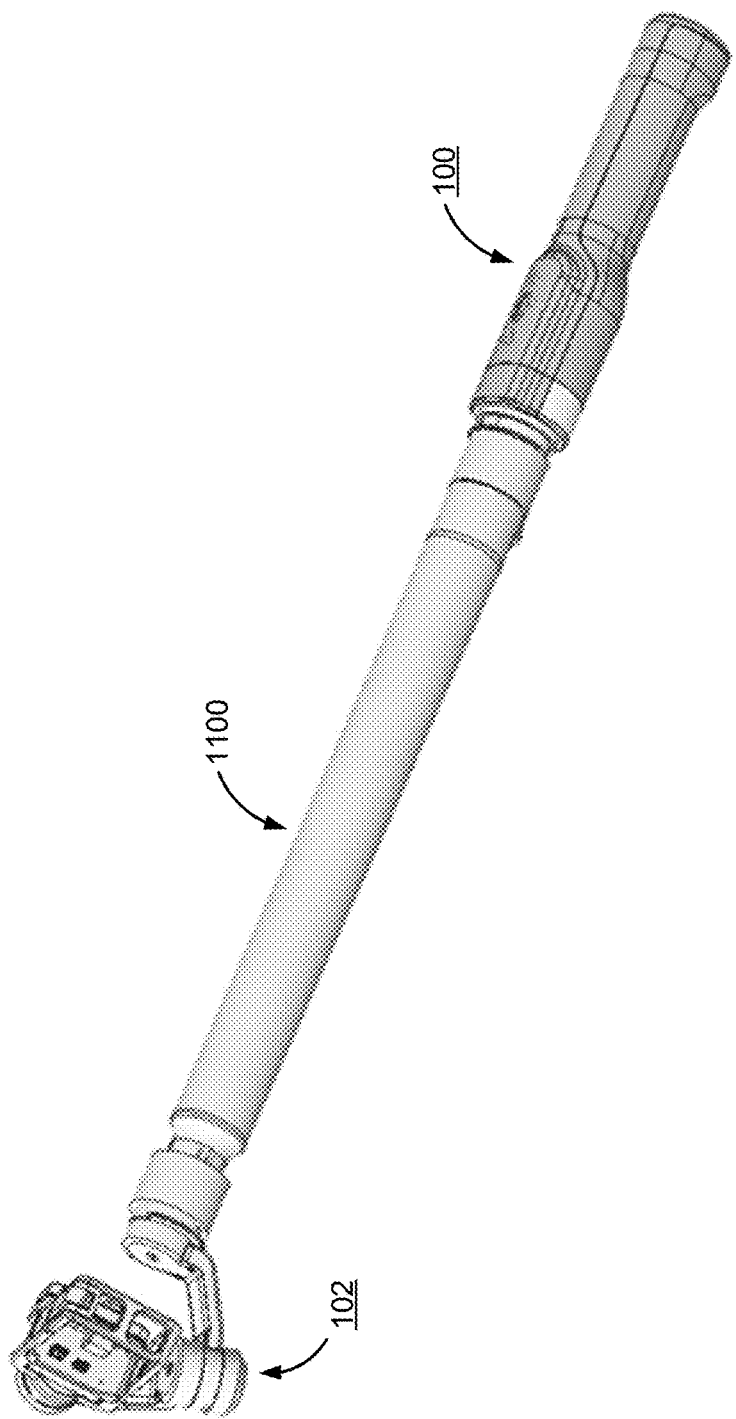
FIG. 11 illustrates the gimbal mount system coupled to an extension arm that couples the gimbal, according to one example embodiment.

FIG. 11 illustrates the gimbal mount system 100 coupled to an extension arm 1100 that couples the gimbal 102, according to one example embodiment. As illustrated in FIG. 11, a first end of the extension arm 1100 mates with the mounting interface 104 of the gimbal mount system 100 while a second end of the extension arm mates with the mounting protrusion 106 of the gimbal 102. Each respective end of the extension arm 1100 may be structured to reciprocally mate with the mounting interface 104 and the mounting protrusion 106. It should be noted that the gimbal mount system 100 can couple to any component configured to secure to the gimbal 102 using the locking mechanism described above with regards to FIGS. 8-9. Such components preferably include a communication/power bus thereby enabling the components to communicatively couple the gimbal mount system 100 to the gimbal 102.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for camera gimbal mount systems as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A gimbal mount system configured to couple to a gimbal, the gimbal configured to secure a camera, the gimbal mount system comprising:
    a handle;
    a power source located within the handle;
    a display located on an outer surface of the handle;
    a mounting interface located within an end of the handle, the mounting interface securely coupling the gimbal to the gimbal mount system;
    a communication interface located within the handle and configured to couple to a reciprocal communication interface of the gimbal and of the camera; and
    a communication bus coupled to the power source, the display, and the communication interface, the communication bus configured to provide power from the power source to the gimbal and to the camera and configured to provide one or more instructions based on a user input received via the display to the gimbal and to the camera.

2. The gimbal mount system of claim 1, further comprising:
    a kickstand configured to extend from the handle.

3. The gimbal mount system of claim 1, further comprising:
    a second communication interface located within the handle, the second communication interface communicatively coupled to the communication bus and configured to couple to one or more of an external power source and an external computing system.

4. The gimbal mount system of claim 1, wherein the one or more instructions comprises one or more of:
    powering the gimbal on and off, controlling a camera shutter, selecting a camera mode or a gimbal mode, tagging a moment of interest within media captured by the camera, and controlling a pitch or yaw of the gimbal.

5. The gimbal mount system of claim 1, further comprising:
    an adapter configured to couple to the gimbal mount system, the adapter configured to couple with a reciprocal mount component, thereby coupling the gimbal mount system to the reciprocal mount component.

6. The gimbal mount system of claim 1, wherein the mounting interface comprises:
    a recess extending into the handle;
    the recess comprises a diameter and extends from an opening proximate the end at a depth.

7. The gimbal mount system of claim 1, wherein the gimbal mount system is removably coupled to both the gimbal and the camera securely coupled together as a single device.

8. A system, comprising:
    a gimbal mount system comprising a handle, a power source within the handle, a display located on an outer surface of the handle, and a mounting interface located within a distal end of the handle; and
    a camera system configured to removably couple to the gimbal mount system via the mounting interface, the camera system comprising a gimbal securely coupled to a camera.

9. The system of claim 8, wherein the mounting interface comprises an opening for receiving a reciprocal mounting protrusion of the gimbal and a recess comprising a first diameter and extending.

10. The system of claim 9, wherein the reciprocal mounting protrusion comprises:
   a protrusion of substantially the first diameter and a first length,
   wherein the reciprocal mounting protrusion is configured for insertion into the mounting interface such that the protrusion is inserted into the recess.

11. The system of claim 8, wherein the reciprocal mounting protrusion comprises padding structures to securely fit the reciprocal mounting protrusion within the mounting interface.

12. The system of claim 9, wherein the gimbal mount system further comprises a locking collar located at the distal end of the body, the locking collar comprising an opening substantially aligned with the opening of the mounting interface such that the gimbal is securely coupled to the gimbal mount system.

13. The system of claim 8, wherein the gimbal is configured to provide information across the communication interface to the gimbal mount system thereby enabling the camera to identify moments of interest within captured media, the information including patterns of motion data measured during the capture of media.

14. The system of claim 13, wherein the information comprises patterns of motion data measured during the capture of media.

15. The system of claim 8, wherein the outer surface is a front side of the handle, the display comprising any of a LED display, a LCD display, a monitor, and any combination thereof.

16. The system of claim 8, wherein the gimbal mount system further comprising a user interface located on the outer surface of the handle.

17. The system of claim 8, wherein a communication interface is located within the gimbal mount system and is configured to couple to a reciprocal communication interface of the camera system.

18. The system of claim 17, wherein the communication interface comprises a suspension system that allows the communication interface to flexibly pivot in one or more directions.

* * * * *